(12) United States Patent
Qiu et al.

(10) Patent No.: US 8,582,544 B2
(45) Date of Patent: Nov. 12, 2013

(54) COMMUNICATION DEVICE FOR CONFIGURING FAILOVER COMMUNICATION SERVICES

(75) Inventors: Chaoxin Qiu, Austin, TX (US); Robert F. Dailey, Austin, TX (US); Jeffrey L. Scruggs, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 210 days.

(21) Appl. No.: 12/948,984

(22) Filed: Nov. 18, 2010

(65) Prior Publication Data

US 2012/0131202 A1 May 24, 2012

(51) Int. Cl.
*H04W 4/00* (2009.01)
*H04W 40/00* (2009.01)
*H04L 12/28* (2006.01)
*G06F 15/16* (2006.01)
*G06F 15/177* (2006.01)

(52) U.S. Cl.
USPC ...... 370/338; 370/395.52; 709/203; 709/227; 455/435.1; 455/445

(58) Field of Classification Search
USPC ............. 709/227, 203; 370/352, 338, 395.52; 455/435.1, 445
See application file for complete search history.

(56) References Cited

U.S. PATENT DOCUMENTS

| | | | |
|---|---|---|---|
| 7,515,535 B2* | 4/2009 | Finn | 370/230 |
| 7,685,293 B2* | 3/2010 | Deshpande et al. | 709/227 |
| 7,688,804 B2* | 3/2010 | Peters | 370/352 |
| 8,055,778 B2* | 11/2011 | Richardson et al. | 709/227 |
| 8,170,005 B2* | 5/2012 | Mukaiyama et al. | 370/352 |
| 8,228,787 B2* | 7/2012 | Liang et al. | 370/221 |
| 2008/0247396 A1 | 10/2008 | Hazard | |
| 2009/0077413 A1 | 3/2009 | Dake | |
| 2010/0039930 A1 | 2/2010 | Liang | |

* cited by examiner

*Primary Examiner* — Alpus H Hsu
*Assistant Examiner* — Anthony Luo
(74) *Attorney, Agent, or Firm* — Guntin & Gust, PLC; Ralph Trementozzi

(57) ABSTRACT

A system that incorporates teachings of the present disclosure may include, for example, a Home Subscriber Server having a processor adapted to receive from a Serving CSCF (S-CSCF) device a request for a subscription profile of a communication device to register the communication device, to detect from the request that the communication device is registered with a primary communication resource and that the communication device is to be registered with the S-CSCF device as a secondary communication resource, and to provide the S-CSCF device the subscription profile without de-registering the communication device from the primary communication resource and without directing the S-CSCF device to the primary communication resource. Other embodiments are disclosed.

20 Claims, 8 Drawing Sheets

400

500

600

COMMUNICATION DEVICE FOR CONFIGURING FAILOVER COMMUNICATION SERVICES

FIELD OF THE DISCLOSURE

The present disclosure relates generally to fault resilience design in communication services.

BACKGROUND

In packet-switched communication systems, such as an Internet Protocol Multimedia Subsystem (IMS) network, it may be common for millions of communication devices to register with a server office of the IMS network. When a server office fails to provide services due to a catastrophic event such as an earthquake or other unexpected event, the communication devices may overload the IMS network with registration requests that could adversely affect the performance of the IMS network.

DETAILED DESCRIPTION

Figure 1:
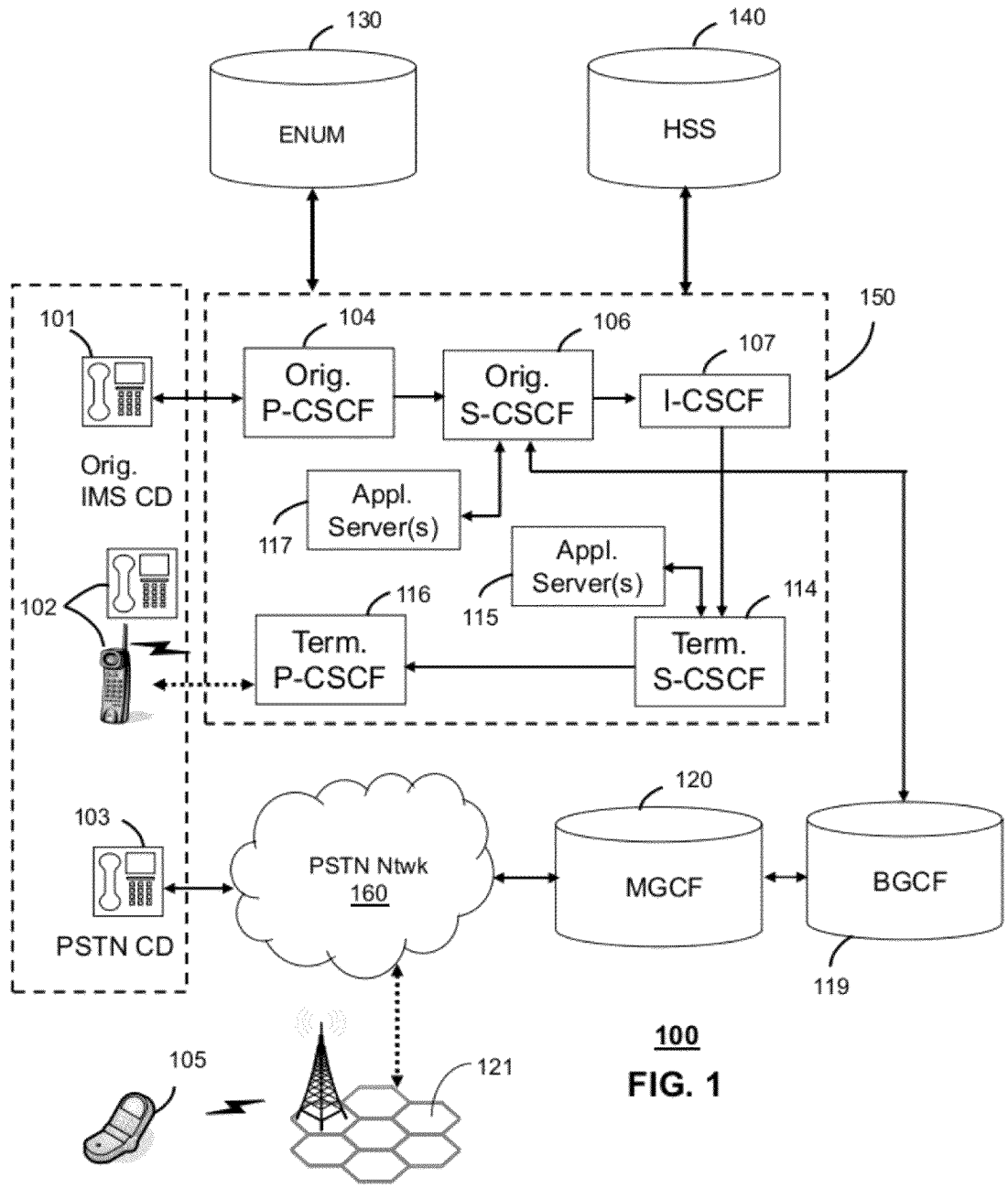
FIGS. 1-2 depict illustrative embodiments of communication systems.

The present disclosure describes, among other things, illustrative embodiments to avoid excessive re-registration requests initiated by communication devices due to a communication fault in an IMS network that supplies communication services to a large population of communication devices. An embodiment of the present disclosure avoids excessive re-registrations by adapting communication devices to initiate a registration process with primary and secondary communication resources in an IMS network without causing de-registration of the communication devices from their respective primary communication resources.

One embodiment of the present disclosure describes a communication device having a processor adapted to transmit a first Session Initiation Protocol (SIP) registration message to an Internet Protocol Multimedia Subsystem (IMS) network, and to receive a first acknowledgment from the IMS network indicating that the communication device has registered with a primary communication resource in the IMS network. The processor can be further adapted to transmit a second SIP registration message to the IMS network that includes an indicator for registering the communication device with a secondary communication resource in the IMS network, to receive a second acknowledgment from the IMS network indicating that the communication device has registered with the secondary communication resource, and to transmit a SIP origination message to the IMS network to establish a communication session with a second communication device. The IMS network can process the SIP origination message by way of the secondary communication resource when the primary communication resource has experienced a communication fault.

One embodiment of the present disclosure describes a Serving CSCF (S-CSCF) device having a processor adapted to receive a registration request initiated by a communication device after the communication device has registered with a primary communication resource, to detect from the registration request that the S-CSCF device is to provide backup communication services to the communication device when a communication fault is detected in the primary communication resource, and to register the communication device.

One embodiment of the present disclosure describes a Home Subscriber Server (HSS) having a processor adapted to receive from an S-CSCF device a request for a subscription profile of a communication device to register the communication device, to detect from the request that the communication device is registered with a primary communication resource and that the communication device is to be registered with the S-CSCF device as a secondary communication resource, and to provide the S-CSCF device the subscription profile without de-registering the communication device from the primary communication resource and without directing the S-CSCF device to the primary communication resource.

For illustration purposes only, the terms S-CSCF device, P-CSCF device, I-CSCF device, and so on, will be used without the word "device." It is, however, understood that any form of a CSCF operates in a device, system, component, or other form of centralized or distributed hardware and software.

FIG. 1 depicts an illustrative embodiment of a communication system 100 employing an Internet Protocol Multimedia Subsystem (IMS) network architecture to facilitate the combined services of circuit-switched and packet-switched communication systems. Communication system 100 can comprise a Home Subscriber Server (HSS) 140, a tElephone NUmber Mapping (ENUM) server 130, and other common network elements of an IMS network 150. The IMS network 150 can establish communications between IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 need not be used when a communication session involves IMS CD to IMS CD communications. A communication session involving at least one PSTN CD may utilize the MGCF 120.

IMS CDs 101, 102 can register with the IMS network 150 by contacting a Proxy Call Session Control Function (P-CSCF) which communicates with an interrogating CSCF, which in turn, communicates with a Serving CSCF (S-CSCF) to register the CDs with the HSS 140. To initiate a communication session between CDs, an originating IMS CD 101 can submit a Session Initiation Protocol (SIP INVITE) message to an originating P-CSCF 104 which communicates with a corresponding originating S-CSCF 106. The originating S-CSCF 106 can submit the SIP INVITE message to one or more application servers (AS) 117 that can provide a variety of services to IMS subscribers.

For example, the application servers 117 can be used to perform originating call feature treatment functions on the calling party number received by the originating S-CSCF 106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 106 can submit queries to the ENUM system 130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. Based on the iFCs in the subscriber profile, one or more terminating application servers 115 may be invoked to provide various call terminating feature services, such as call forwarding no answer, do not disturb, music tones, simultaneous ringing, sequential ringing, etc.

In some instances the aforementioned communication process is symmetrical. Accordingly, the terms "originating" and "terminating" in FIG. 1 may be interchangeable. It is further noted that the communication system 100 can be adapted to support video conferencing. It is further contemplated that the CDs of FIG. 1 can operate as wireline or wireless devices. The CDs of FIG. 1 can be communicatively coupled to a cellular base station 121, a femtocell (not shown), a WiFi router, a DECT base unit, or another suitable wireless access unit to establish communications with the IMS network 150 of FIG. 1.

If the terminating communication device is instead a PSTN CD such as CD 103 or CD 105 (in instances where the cellular phone only supports circuit-switched voice communications), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Multiple wireline and wireless communication technologies are therefore contemplated for the CDs of FIG. 1.

It is further contemplated that cellular phones supporting LTE can support packet-switched voice and packet-switched data communications and thus may operate as IMS-compliant devices. In this embodiment, the cellular base station 121 may communicate directly with the IMS network 150.

Figure 2:
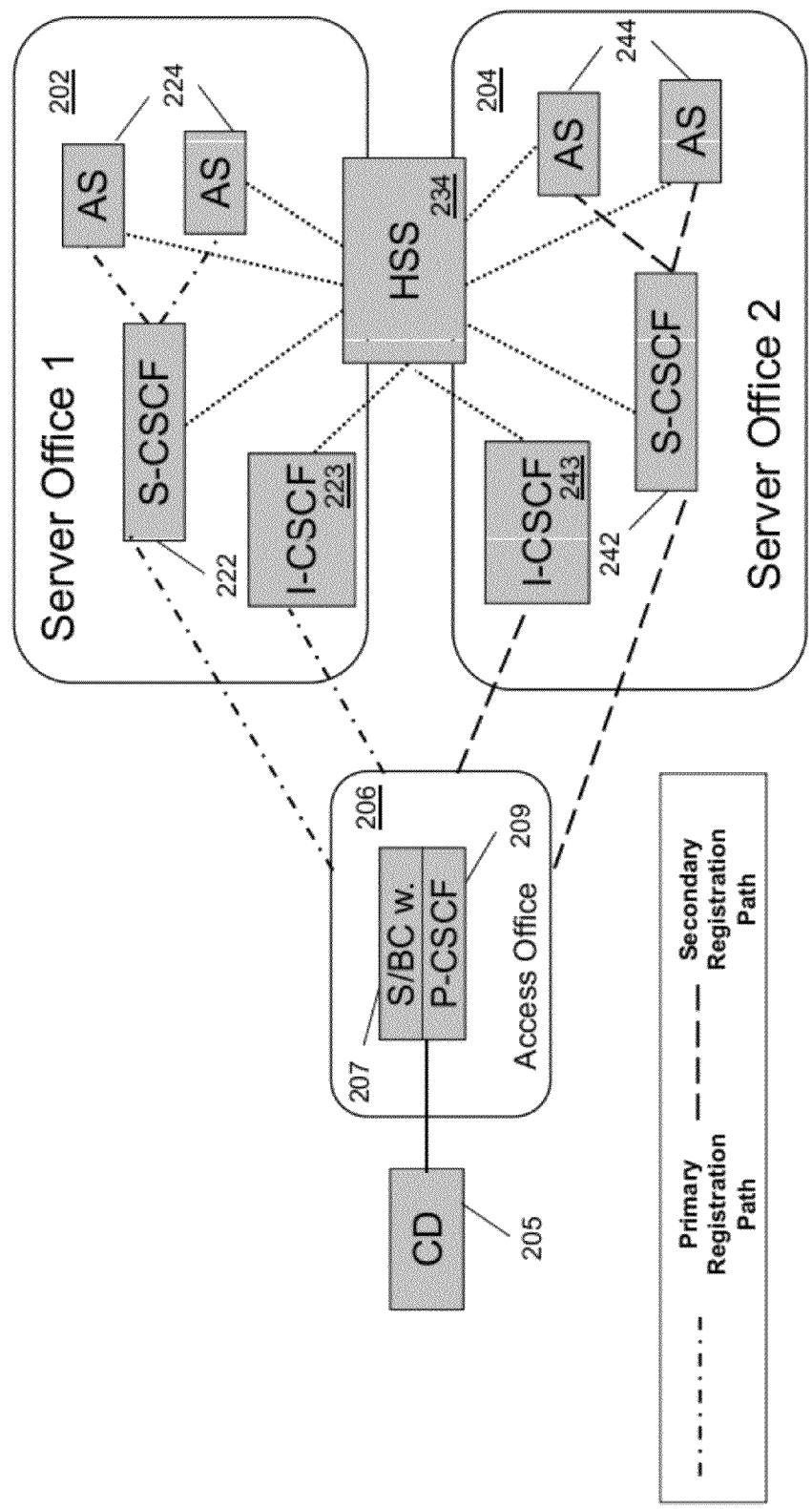

The IMS network 150 of FIG. 1 represents a single instance of network elements commonly utilized for end-to-end communications. In practice, however, there can be many instances of the IMS network elements shown in FIG. 1. Several instances of S-CSCF's and application servers can be clustered into a server office which provides communication services to perhaps millions of subscribers. The P-CSCF's can be clustered in access offices with session border controllers (not shown in FIG. 1). FIG. 2 illustrates first and second server offices. A communication device can gain access to either of server offices 202 or 204 by way of a session border controller and P-CSCF pair. One or more instances of I-CSCF and HSS can also be accessed by the network elements of either of server offices 202 and 204, or the access office 206 as shown by the dotted lines.

Referring back to FIG. 1, the P-CSCFs 104 and 116 and the S-CSCFs 106 and 114 can be adapted to avoid excessive failover re-registrations resulting from communication faults in the IMS network 150 as will be described in illustrative embodiments of the methods described in FIGS. 3-6.

Referring to FIG. 2, each of server offices 202 and 204 can provide communication services to CD 205 by way of a session border controller (S/BC) 207 and a P-CSCF 209 located at an access office 206. As will be described by the methods of FIGS. 3-6, server office 202 can serve as a primary communication resource for serving the communication needs of CD 205. CD 205 registers with the server office 202 as described earlier in FIG. 1. Server office 204 may serve as a secondary communication resource to CD 205 when an unrecoverable or serious fault is detected at server office 202 as will be described by the methods of FIGS. 3-6 supported by the flow diagrams of FIGS. 7-8.

Figure 3:
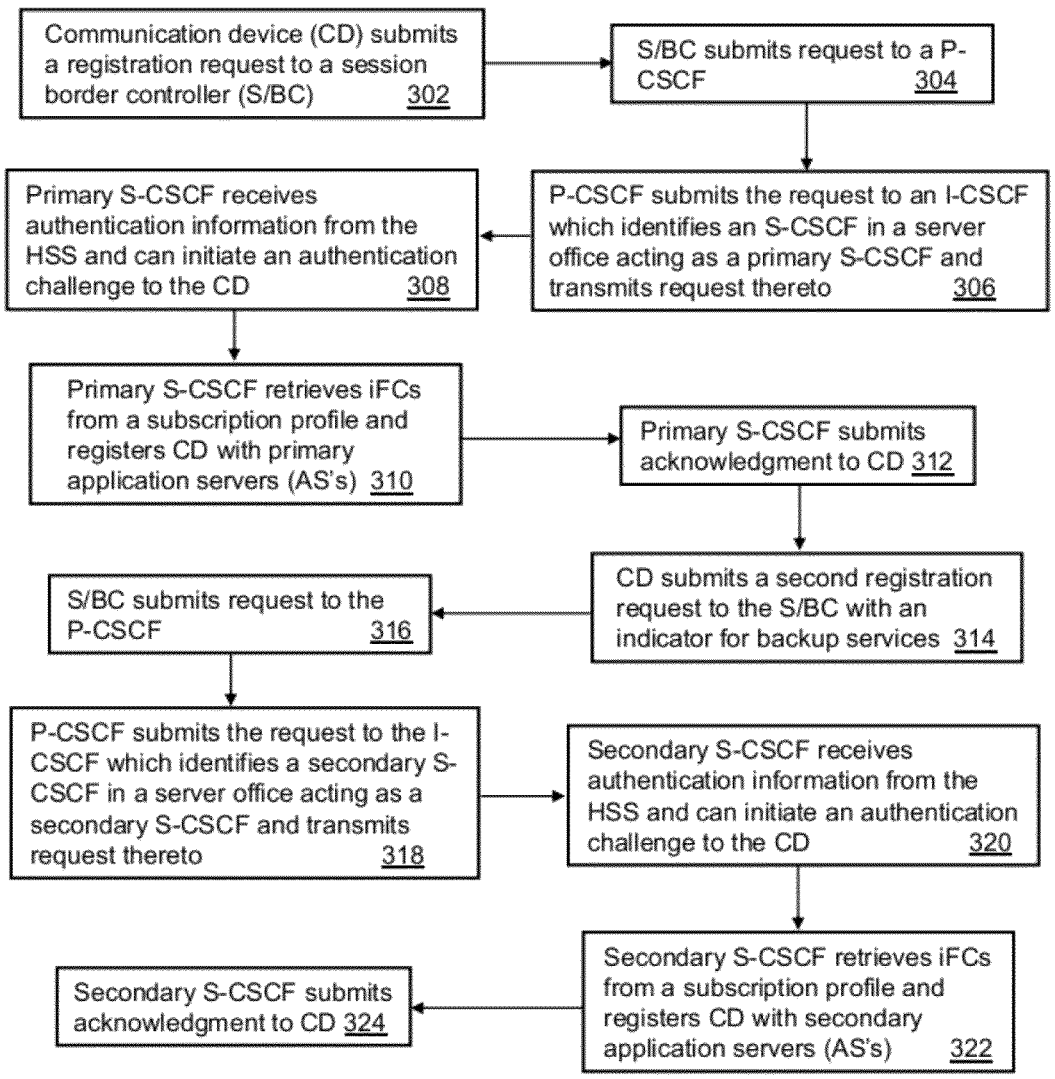
FIG. 3-6 depict illustrative embodiments of methods operating in portions of the systems described in FIGS. 1-2.
Figure 7:
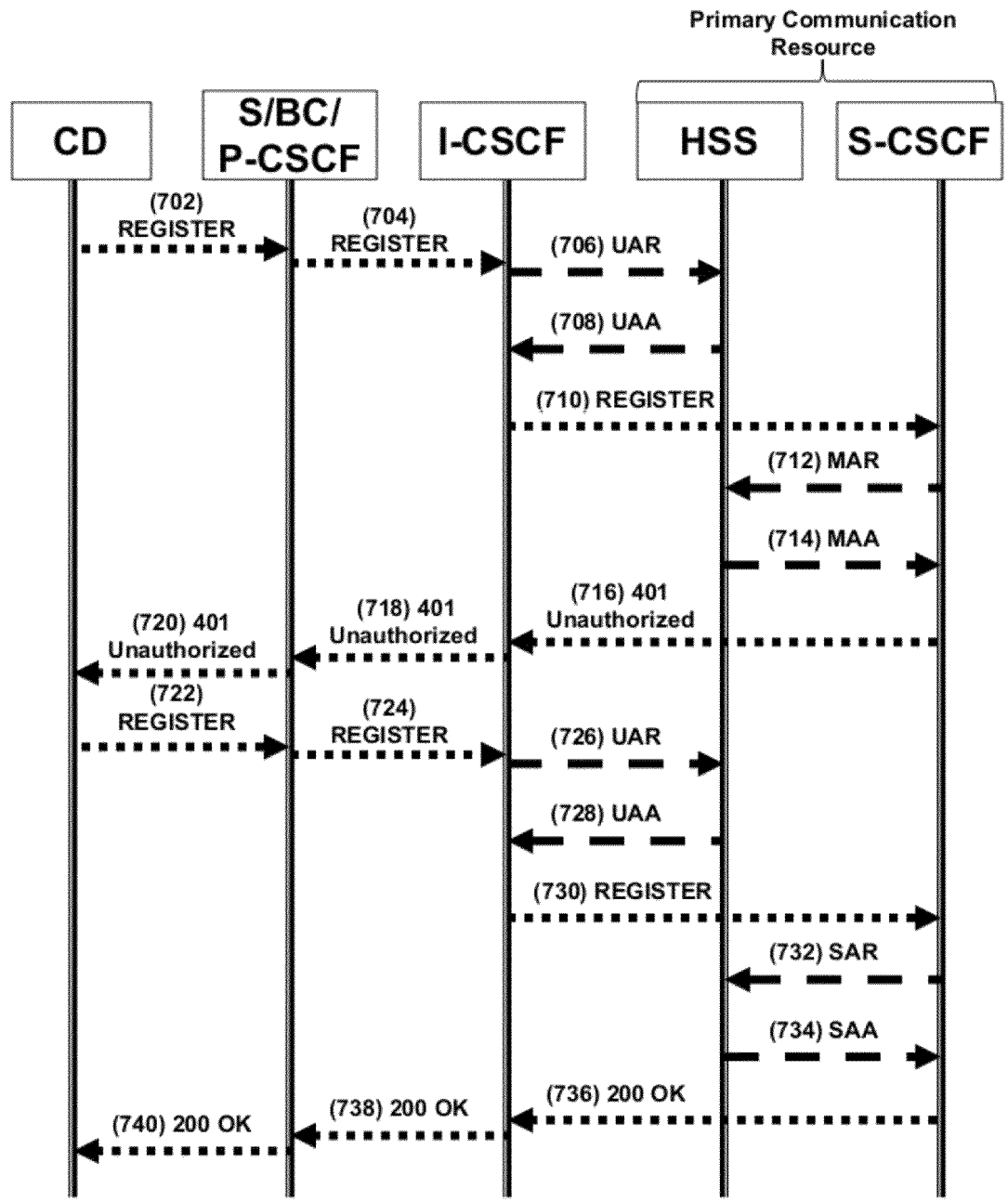
FIGS. 7-8 depict illustrative embodiments of flow diagrams.
Figure 8:
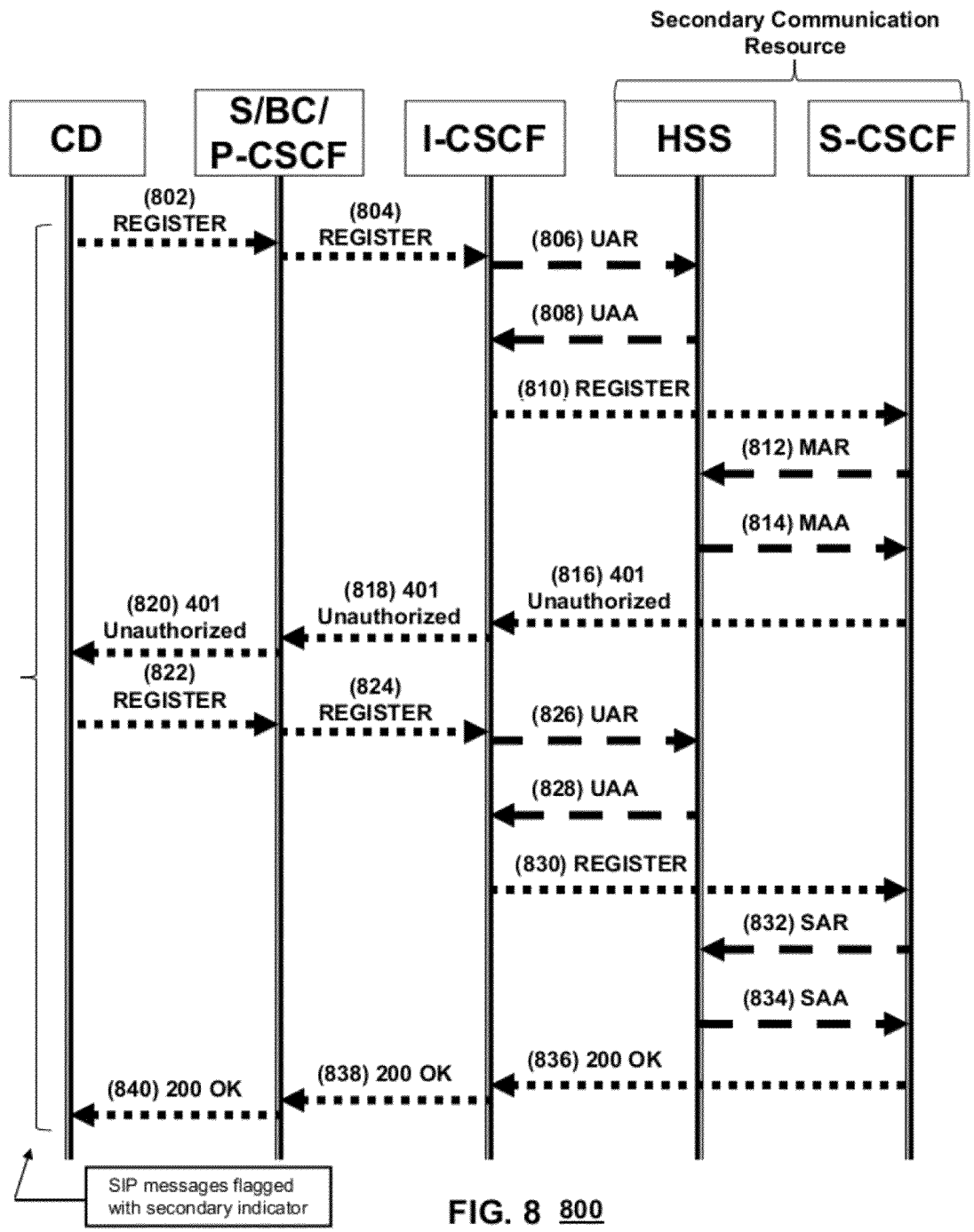

Referring to FIG. 3 as supported by the signal flow diagrams of FIGS. 7-8, method 300 can begin with 302 in which a communication device such as the CD 205 of FIG. 2 submits a registration request to access office 206. The S/BC 207 submits, at 304, the request to the P-CSCF 209 of access office 206. The culmination of this process is shown at step 702 of FIG. 7. At 306, the P-CSCF 209 submits the registration request to an I-CSCF 223 of server office 1 which transmits to the HSS 234 a DIAMETER command in the form of a user authorization request (UAR), at 706. The HSS 234 can in turn reply with a DIAMETER command in the form of a user authorization answer (UAA), at 708, which provides guidelines to the I-CSCF 223 for choosing the S-CSCF 222 in server office 202. At 710, the I-CSCF 223 transmits the registration request to the S-CSCF 222 at server office 202. It should be noted that the server office 202 can have several S-CSCFs other than the S-CSCF 222 shown in FIG. 2. Accordingly, a different S-CSCF may be selected according to the registration behavior of the CD 205.

For this example, the S-CSCF 222 of server office 202 will be regarded as the primary S-CSCF 222 since it is the S-CSCF to which the P-CSCF 209 of access office 206 would normally use for registrations and call originations or terminations for CD 205. Upon receiving the registration request, the primary S-CSCF 222 can retrieve at 308 from the HSS 234 (or another network element of the IMS network 200) authentication information associated with the CD 205. This step can be accomplished by the primary S-CSCF 222 of server office 202 transmitting to the HSS 234 a multimedia authentication request (MAR) DIAMETER command, at 712, of FIG. 7. The HSS 234 can in turn reply, at 714, with a multimedia authentication answer (MAA) DIAMETER command that includes the authentication information.

At 308, the primary S-CSCF 222 can transmit an authentication challenge to the CD 205 as depicted by steps 716 through 720. The authentication challenge can force the CD 205 to submit credentials in a new registration message as depicted at steps 722 through 730. In this registration process, the CD 205 provides the primary S-CSCF 222 authentication data with the registration message. The primary S-CSCF 222 can compare this information to authentication data supplied by the HSS 234 to validate the CD 205.

If the authentication succeeds, the primary S-CSCF 222 can proceed to 310 where it retrieves a subscription profile associated with the CD 205. The primary S-CSCF 222 can accomplish this by transmitting to the HSS 234, at 732, a server assignment request (SAR) DIAMETER command. The HSS 234 can respond, at 734, with a server assignment (SAA) DIAMETER command which includes the subscription profile. The primary S-CSCF 222 can then notify the CD 205, at 312, that it is registered with the IMS network 200 as depicted at steps 736 through 740.

The subscription profile can include one or more initial filter criteria (iFCs) which can be used to provision the application servers 224 of server office 202 (which will be referred to as primary application servers 224 in what follows). iFCs can be used for providing call origination features such as caller ID blocking, 7-digit dialing, and so on as described for FIG. 1. Each iFC can have two URIs, one that points to the primary application server 224 associated with the iFC, and another that points to the secondary application server 244 associated with the same iFC for backup communication services as will be described below. At 310, the primary S-CSCF 222 can retrieve the iFCs from the subscription profile and register the CD 205 with the primary application servers 224 of server office 202. At 312, the primary S-CSCF 222 transmits an acknowledgment to the CD 205 indicating that the registration was successful.

At 314, the CD 205 can be adapted to initiate a second SIP registration request which it forwards to the S/BC 207. The second SIP registration request can include an indicator that specifies that the CD 205 desires backup communication services from the IMS network 200. The flow diagram of FIG. 8 describes how these backup services may be established. At 316, the S/BC 207 submits the request to the P-CSCF 209 which in turn forwards it to the I-CSCF 243 of server office 204, at 318. Steps 314 through 318 are depicted in part by steps 802 and 804 of FIG. 8. The I-CSCF 243 detects the indicator in the second SIP registration request, and determines from this indicator that backup communication services are requested. The I-CSCF 243 can construct a UAR DIAMETER message with the indicator (or derivative thereof) embedded in an attribute value pair (AVP) field of the DIAMETER message. The AVP field can have a header field and data field. The AVP header field can include code, flag, length, and/or vendor-ID fields. The AVP data field can comprise a flag that indicates with a single bit (or otherwise) that backup services are being requested. Other AVP header and data configurations are possible for indicating a request for backup communications, each of which is contemplated by this disclosure.

The I-CSCF 243 can transmit the UAR DIAMETER message at step 806 to the HSS 234. In prior art IMS networks, the HSS 234 is generally adapted to transmit a UAA DIAMETER message to the P-CSCF 209 to redirect the P-CSCF 209 to re-register the communication device with the primary S-CSCF 222 of server office 202. Thus, the second registration request would not serve to establish backup communication services. In yet other prior art systems, the HSS 234 can be adapted to de-register a communication device that is registered with a server office of the IMS network when another SIP registration request is received from another server office. The de-registration process would therefore defeat a configuration for backup services. In the present disclosure, the HSS 234 can be adapted to detect the indicator in the UAR DIAMETER message, and thereby determine that backup services are being established and de-registration is not warranted even though the CD 205 is registered with a different server office. In response to detecting the indicator, the HSS 234 can be adapted to transmit to the I-CSCF 243 a UAA DIAMETER message, at 808, that includes an identification of a secondary S-CSCF 242 for providing backup communication services without initiating a de-registration process. The pairing of primary and secondary S-CSCFs 222 and 242 can be pre-provisioned in the HSS 234 by a service provider of the IMS network 200.

Upon receiving the SIP registration request, the secondary S-CSCF 242 can retrieve, at 320, from the HSS 234 (or another network element of the IMS network) authentication information associated with the CD 205. This step can be accomplished by the secondary S-CSCF 242 of server office 202 transmitting to the HSS 234 a multimedia authentication request MAR DIAMETER command, at 812, of FIG. 8. The HSS 234 can in turn reply, at 814, with a multimedia authentication answer MAA DIAMETER command that includes the authentication information.

At 320, the secondary S-CSCF 242 has the option to transmit another authentication challenge to the CD 205 as depicted by steps 816 through 820. The authentication challenge can once again force the CD 205 to submit credentials in a new registration message as depicted at steps 822 through 830. In this registration process, the CD 205 provides the secondary S-CSCF 242 authentication data with the registration message. The secondary S-CSCF 242 can compare this information to authentication data supplied by the HSS 234 to validate the CD 205.

If the authentication succeeds, the secondary S-CSCF 242 can proceed to 322 where it retrieves a subscription profile associated with the CD 205. The secondary S-CSCF 242 can accomplish this by transmitting to the HSS 234, at 832, a server assignment request SAR DIAMETER command. The HSS 234 can respond, at 834, with a server assignment SAA DIAMETER command which includes the subscription profile. The secondary S-CSCF 242 can then notify the CD 205, at 324, that it is registered with the IMS network 200 as depicted at steps 836 through 840.

The determination of which S-CSCF of which server office 204 will provide backup services can be preconfigured in the IMS network 200, notably in all P-CSCFs, I-CSCFs and S-CSCFs. Each P-CSCF and I-CSCF can be preconfigured with a table of S-CSCFs and their companion secondary S-CSCFs, respectively. Additionally, each S-CSCF can be preconfigured with the information of its remote secondary S-CSCF. In one embodiment, each application server can also be preconfigured with information that identifies a remote secondary application server which provides backup services. In another embodiment, the primary and secondary application servers can be identified in the iFCs of the CD 205, which can provide more flexibility to manage the IMS network 200 of FIG. 2. Although it is possible for the P-CSCF to be configured with a single I-CSCF to communicate with the primary and secondary server offices 202 and 204, it is contemplated that the P-CSCFs can also be preconfigured with different I-CSCFs for communicating with the primary and secondary server offices 202 and 204 to avoid a single point of failure. This latter embodiment is shown in FIG. 2 by the association of I-CSCFs 223 and 243 with server offices 202 and 204, respectively.

The selection of server office 204 as a backup communication service can be based on the geographic disparity between server offices 202 and 204 or other criteria (such as load balancing, bandwidth utilization, etc.) suitable to meeting the service provider's business or technical objectives.

Once CD 205 has registered with the primary and secondary S-CSCFs 222 and 242, the P-CSCF 209 can be configured to redirect communications from the server office 202 (primary server office) to the server office 204 (secondary server office) upon detecting a communication fault in the primary server office 202 as will be described below.

Figure 4:
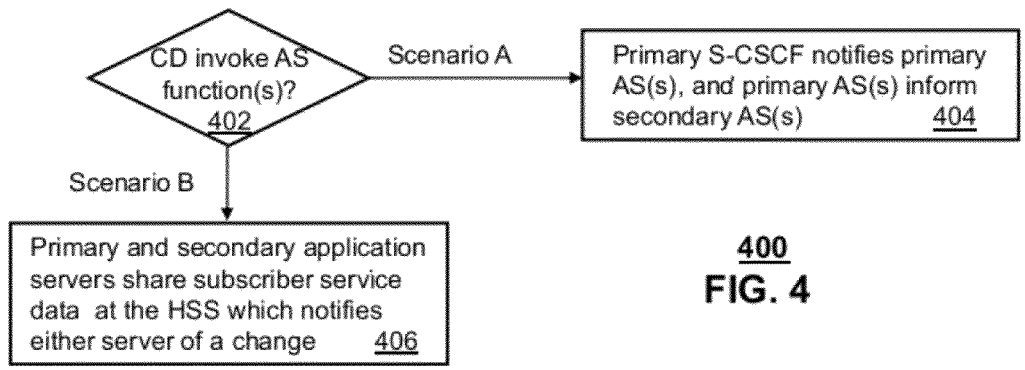

Referring to FIG. 4, method 400 describes how the primary and secondary application servers 224 and 244 of server offices 202 and 204 can be kept synchronized as a user of the CD 205 invokes application server functions such as call forwarding. If an application server function is invoked at step 402, two embodiments can be used to service an application server function request (e.g., *72). The SIP message transmitted by the CD 205 and received by the primary S-CSCF 222 from access office 206 can be directed, at 404, to the primary application server(s) 224 of server office 202. If the application server feature invoked by the CD 205 is a static feature (e.g., call forwarding), then the affected primary application server(s) 224 can in turn inform the secondary application server(s) 244 of the change at server office 204. The primary application server(s) 224 of server office 202 can identify the secondary application server(s) 244 according to the URIs provided in the iFC.

In yet another embodiment, application servers can store their subscriber service data in the HSS 234 (to differentiate from other subscriber profiles that are mandatory in the HSS 234). Application servers can also subscribe to the HSS 234 to get notification from the HSS 234 if part of the subscriber service data is changed. To remain synchronous between the primary and secondary application servers 224 and 244 of server offices 202 and 204, both primary and secondary application servers 224 and 244 can share, at 406, their subscriber service data in the HSS 234 and both can subscribe to the HSS 234 to receive notifications of any changes to the shared subscriber service data. Accordingly, if the CD 205 invokes a change to the subscriber service data of the primary application servers 224, the HSS 234 can be adapted to notify the secondary application servers 244 of the change, which results in an update that maintains the primary and secondary application servers 224 and 244 synchronized.

It is further contemplated that information can be shared between the primary and secondary application servers 224 and 244 by utilizing any storage device in the IMS network 200 that can be configured to store setting in the primary or secondary application servers 224 and 244.

Figure 5:
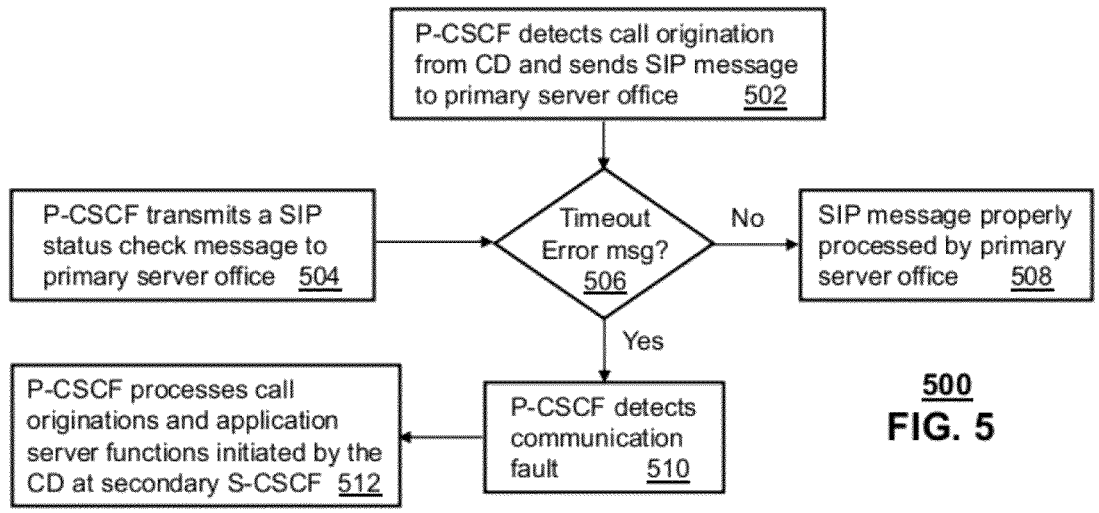

Referring to FIG. 5, method 500 describes illustrative embodiments in which the P-CSCF 209 of access office 206 switches to the secondary S-CSCF 242 of server office 204. At 502, the P-CSCF 209 can detect a call origination initiated by the CD 205 at access office 206. In response, the P-CSCF 209 can transmit a SIP INVITE message as previously described for FIG. 1 to the primary S-CSCF 222 for processing. If the primary S-CSCF 222 is operating properly, it will process the SIP INVITE message, at 508, and establish a call with a termination communication device as previously described in FIG. 1. If, however, the primary S-CSCF 222 or other network elements such as, for example, the primary application servers 224 in server office 202 are malfunctioning or unavailable and the P-CSCF 209 of access office 206 fails to detect, at 506, a response within a timeout period established by the service provider, the P-CSCF 209 can attempt a retransmission of the SIP INVITE message. If a response timeout is encountered again, at 506, and the number of retransmissions exceeds a predetermined threshold set by the service provider, then the P-CSCF 209 can proceed to 510 where it identifies a communication fault, establishes communications with the secondary S-CSCF 242, and processes future call originations from the CD 205 at the secondary S-CSCF 242. A P-CSCF 209 can decide that a primary S-CSCF 222 is not available for service if the primary S-CSCF 222 does not respond to SIP requests from the P-CSCF or it receives a SIP 408 or 503 error message, at 506, to indicate system level faults for other communication resources such as the primary application servers 224.

To detect communication faults early, the P-CSCF 209 can submit, at 504, SIP status check messages to the primary S-CSCF 222. If no response is detected after the timeout period and retransmissions have exceeded an established threshold, then the P-CSCF 209 can proceed to 510 and 512 as previously described. An I-CSCF can also decide that a primary S-CSCF 222 is not available for service if the primary S-CSCF 222 does not respond to SIP requests from the I-CSCF or it receives a SIP 408 or 503 error to indicate system level faults for other communication resources such as the primary application servers 224.

Figure 6:
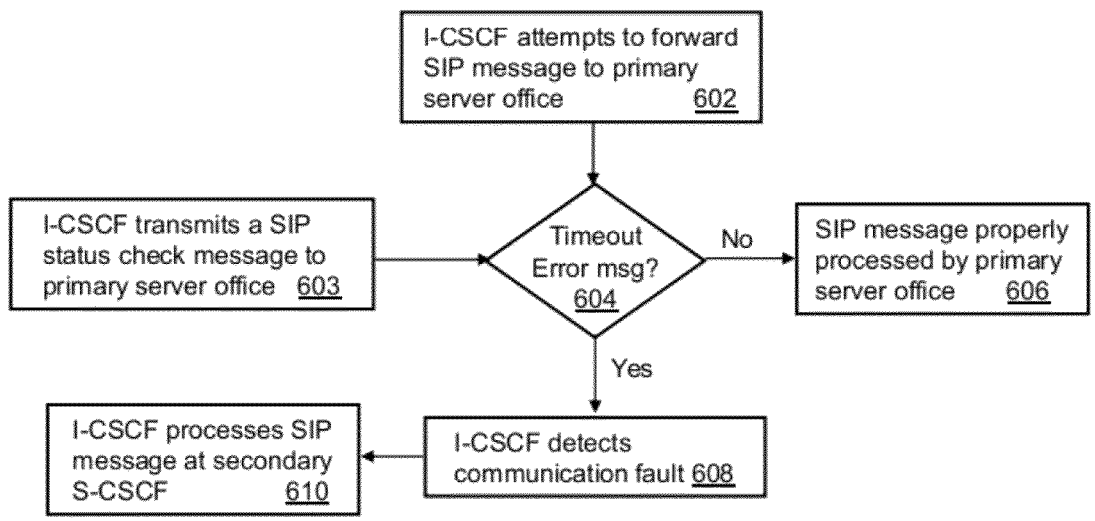

Referring to FIG. 6, method 600 describes illustrative embodiments in which the I-CSCF of FIGS. 1-2 resorts to utilizing a second communication resource when an unrecoverable or serious communication fault is detected at a server office. At 602, the I-CSCF can receive a call origination SIP message from an originating S-CSCF as previously described for FIG. 1. The I-CSCF can receive from the HSS an identification of the terminating S-CSCF. In one embodiment, communications between the I-CSCF and the terminating S-CSCF can be successful in reaching the terminating communication device as was described for FIG. 1. This embodiment is represented at 606.

If, however, the I-CSCF attempts to communicate with the terminating S-CSCF and no response is detected after the timeout period, or an error message such as SIP 408 or 503 is detected at 604 and retransmissions have exceeded an established threshold, then the I-CSCF can proceed to 608 where it determines an unrecoverable or serious communication fault has occurred. At 610, the I-CSCF can establish communications with the secondary S-CSCF and complete the call from the server office of the secondary S-CSCF. At 603, the I-CSCF can also be adapted to transmit status check messages to the primary S-CSCF. If no response is received within a timeout period at 604, and retransmission attempts have exceeded a threshold set by the service provider, then the I-CSCF can resort to utilizing the secondary S-CSCF as described by steps 608, 610.

Similarly, the P-CSCF associated with the terminating communication device can detect that the terminating S-CSCF is malfunctioning (e.g., see steps 504, 506, 510, and 512) and switch to the secondary S-CSCF as described earlier. Thus when the I-CSCF switches to the secondary S-CSCF it has access to the terminating communication device.

Figure 9:
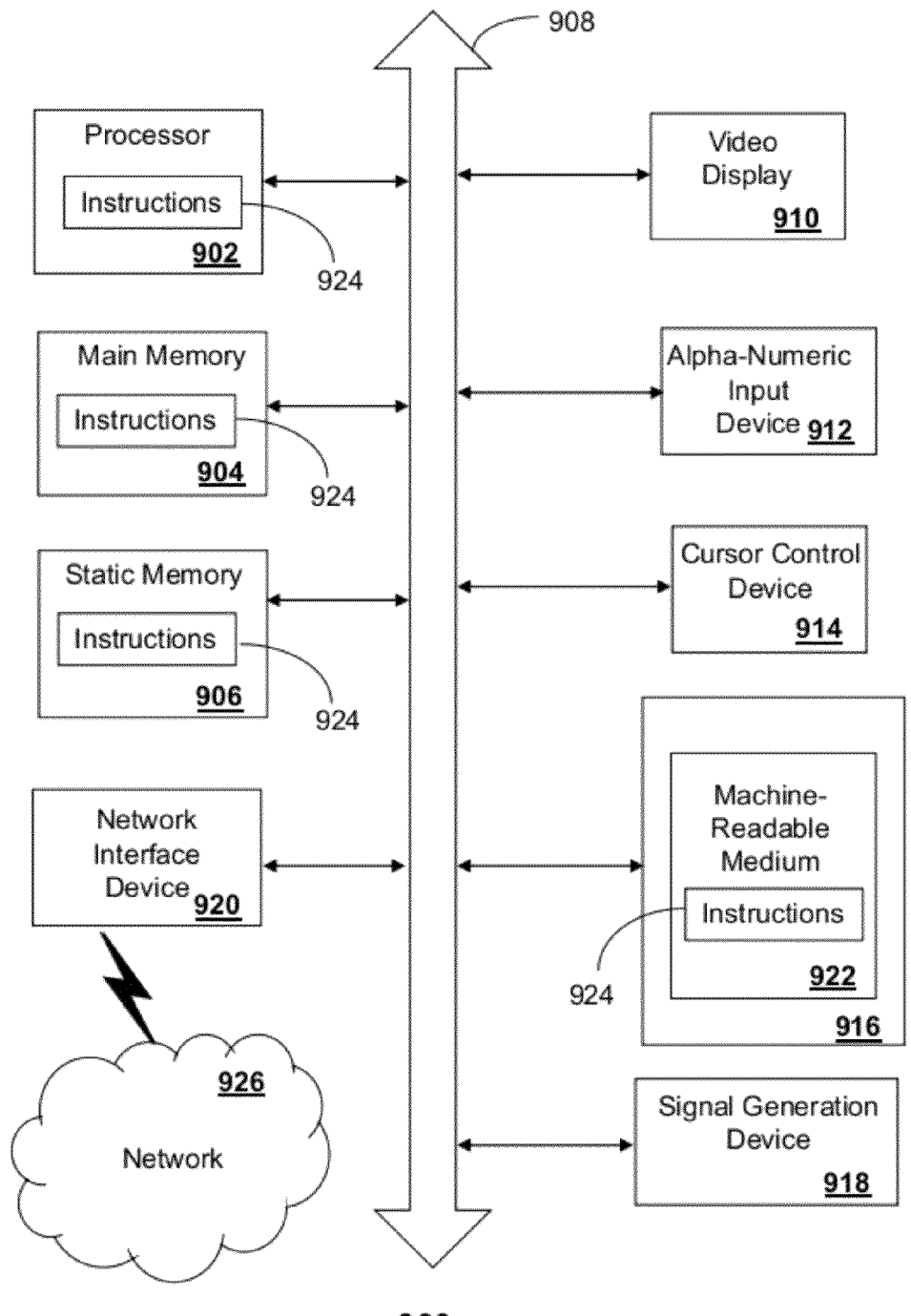
FIG. 9 is a diagrammatic representation of a machine in the form of a computer system within which a set of instructions, when executed, may cause the machine to perform any one or more of the methods discussed herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as the CDs and the network elements of the IMS networks shown in FIGS. 1-2 as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a non-transitory machine-readable medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over a network 926 using the instructions 924. The instructions 924 may further be transmitted or received over the network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a memory to store computer instructions; and a processor in communication with the memory, wherein the processor, responsive to executing the computer instructions, performs operations comprising:

transmitting a first session-initiation-protocol registration message to an internet-protocol-multimedia-subsystem network;

receiving a first acknowledgment from the internet-protocol-multimedia-subsystem network indicating that the communication device has registered with a primary communication resource in the internet-protocol-multimedia-subsystem network;

transmitting a second session-initiation-protocol registration message to the internet-protocol-multimedia-subsystem network, wherein the second session-initiation-protocol registration message comprises an indicator for registering the communication device with a secondary communication resource in the internet-protocol-multimedia-subsystem network, the indicator including an identification that the secondary communication resource is to provide backup communications without initiating a de-registration process thereby causing a prevention of de-registration from the primary communication resource in the internet-protocol-multimedia-subsystem;

receiving a second acknowledgment from the internet-protocol-multimedia-subsystem network indicating that the communication device has registered with the secondary communication resource; and transmitting a session-initiation-protocol-origination message to the internet-protocol-multimedia-subsystem network to establish a communication session with a second communication device, whereby the session-initiation-protocol origination message is processed by the internet-protocol-multimedia-subsystem network by way of the secondary communication resource in an event that the primary communication resource is unavailable.

2. The communication device of claim 1, wherein the internet-protocol-multimedia-subsystem network processes the session-initiation-protocol origination message by way of the primary communication resource so long as the primary communication resource in the internet-protocol-multimedia-subsystem network has not experienced a communication fault.

3. The communication device of claim 1, wherein the first session-initiation-protocol registration message is received by a proxy-call-session-control-function device, wherein the proxy-call-session-control-function device transmits the first session-initiation-protocol registration message to an interrogating-call-session-control-function device that identifies a primary serving-call-session-control-function device in the primary communication resource, and wherein the primary serving-call-session-control-function device registers the communication device with a primary application server operating in the primary communication resource.

4. The communication device of claim 3, wherein the second session-initiation-protocol registration message is received by the proxy-call-session-control-function device, wherein the proxy-call-session-control-function device transmits the second session-initiation-protocol registration message to the interrogating-call-session-control-function device, and wherein the interrogating-call-session-control-function device determines from the indicator in the second session-initiation-protocol registration message that the communication device is to be registered with the secondary communication resource.

5. The communication device of claim 4, wherein the interrogating-call-session-control-function device identifies a secondary serving-call-session-control-function device in the secondary communication resource, and wherein the secondary serving-call-session-control-function device registers the communication device with a secondary application server operating in the secondary communication resource.

6. The communication device of claim 5, wherein a home-subscriber server transmits a response to the interrogating-call-session-control-function device based on the indicator included in the second session-initiation-protocol registration message, and wherein the response directs the interrogating-call-session-control-function device to initiating a secondary registration without de-registering the communication device from the primary communication resource and without directing the interrogating-call-session-control-function to send the session-initiation-protocol registration request to the primary communication resource.

7. The communication device of claim 6, wherein the home-subscriber server transmits the response to the interrogating-call-session-control-function device responsive to receiving from the interrogating-call-session-control-function a DIAMETER message with the indicator or a derivative thereof embedded in an attribute value pair field of the DIAMETER message.

8. The communication device of claim 5, wherein the proxy-call-session-control-function device provides communication services to the communication device via the secondary serving-call-session-control-function device responsive to detecting a communication fault in the primary communication resource without interrupting a communication session initiated by the communication device.

9. The communication device of claim 3, wherein a secondary serving-call-session-control-function device of the secondary communication resource configures a secondary application server according to an initial filter criteria, and wherein each initial filter criteria comprises a primary uniform resource identifier associated with a primary application server and a secondary uniform resource identifier associated with a secondary application server.

10. The communication device of claim 3, wherein the operations comprise transmitting a third session-initiation-protocol message to the primary communication resource to enable an application service feature of the primary application server, wherein the primary application server stores at a storage device subscriber service data comprising a description of the application service feature enabled for the communication device.

11. The communication device of claim 10, wherein the storage device operates in a home-subscriber server, wherein a secondary application server of the secondary communication resource retrieve the subscriber service data from the home-subscriber server and enable the application service feature responsive to receiving a first notification from the home-subscriber server when the primary application server updates the subscriber service data stored in the home-subscriber server, and wherein the primary application server retrieves the subscriber service data from the home-subscriber server and enable an application service feature of the secondary application server responsive to receiving a second notification from the home-subscriber server when the secondary application server updates the subscriber service data stored in the home-subscriber server.

12. The communication device of claim 3, wherein the operations comprise transmitting a third session-initiation protocol message to the primary communication resource to enable an application service feature of the primary application server, wherein the primary application server enables the application service feature, identifies the application server, and notifies a secondary application server of the application service feature requested by the communication device.

13. A method, comprising:
- transmitting, by a communication device comprising a processor, a first session-initiation-protocol registration message to an internet-protocol-multimedia-subsystem network;
- receiving, by the communication device, a first acknowledgment from the internet-protocol-multimedia-subsystem network indicating that the communication device has registered with a primary communication resource in the internet-protocol-multimedia-subsystem network;
- transmitting, by the communication device, a second session-initiation-protocol registration message to the internet-protocol-multimedia-subsystem network, wherein the second session-initiation-protocol registration message comprises an indicator for registering the communication device with a secondary communication resource in the internet-protocol-multimedia-subsystem network, the indicator including an identification that the secondary communication resource is to provide backup communications without initiating a de-registration process thereby causing a prevention of de-registration from the primary communication resource in the internet-protocol-multimedia-subsystem;
- receiving, by the communication device, a second acknowledgment from the internet-protocol-multimedia-subsystem network indicating that the communication device has registered with the secondary communication resource; and
- transmitting, by the communication device, a session-initiation-protocol-origination message to the internet-protocol-multimedia-subsystem network to establish a communication session with a second communication device, whereby the session-initiation-protocol origination message is processed by the internet-protocol-multimedia-subsystem network by way of the secondary communication resource in an event that the primary communication resource is unavailable.

14. The method of claim 13, wherein the first session-initiation-protocol registration message is received by a proxy-call-session-control-function device, wherein the proxy-call-session-control-function device transmits the first session-initiation-protocol registration message to an interrogating-call-session-control-function device that identifies a primary serving-call-session-control-function device in the primary communication resource, and wherein the primary serving-call-session-control-function device registers the communication device with a primary application server operating in the primary communication resource.

15. The method of claim 14, wherein the second session-initiation-protocol registration message is received by the proxy-call-session-control-function device, wherein the proxy-call-session-control-function device transmits the second session-initiation-protocol registration message to the interrogating-call-session-control-function device, and wherein the interrogating-call-session-control-function device determines from the indicator in the second session-initiation-protocol registration message that the communication device is to be registered with the secondary communication resource.

16. The method of claim 15, wherein the interrogating-call-session-control-function device identifies a secondary serving-call-session-control-function device in the secondary communication resource, and wherein the secondary serving-call-session-control-function device registers the communication device with a secondary application server operating in the secondary communication resource.

17. A non-transitory, machine-readable storage medium, comprising instructions, wherein execution of the instructions causes a processor to perform operations comprising:
- transmitting a first session-initiation-protocol registration message to an internet-protocol-multimedia-subsystem network;
- receiving a first acknowledgment from the internet-protocol-multimedia-subsystem network indicating that a communication device comprising the processor has registered with a primary communication resource in the internet-protocol-multimedia-subsystem network;
- transmitting a second session-initiation-protocol registration message to the internet-protocol-multimedia-subsystem network, wherein the second session-initiation-protocol registration message comprises an indicator for registering the communication device with a secondary communication resource in the internet-protocol-multimedia-subsystem network, the indicator including an identification that the secondary communication resource is to provide backup communications without initiating a de-registration process thereby causing a prevention of de-registration from the primary communication resource in the internet-protocol-multimedia-subsystem;
- receiving a second acknowledgment from the internet-protocol-multimedia-subsystem network indicating that the communication device has registered with the secondary communication resource; and
- transmitting a session-initiation-protocol-origination message to the internet-protocol-multimedia-subsystem network to establish a communication session with a second communication device, whereby the session-initiation-protocol origination message is processed by the internet-protocol-multimedia-subsystem network by way of the secondary communication resource in an event that the primary communication resource is unavailable.

18. The non-transitory, machine-readable storage medium of claim 16, wherein the first session-initiation-protocol registration message is received by a proxy-call-session-control-function device, wherein the proxy-call-session-control-function device transmits the first session-initiation-protocol registration message to an interrogating-call-session-control-function device that identifies a primary serving-call-session-control-function device in the primary communication resource, and wherein the primary serving-call-session-control-function device registers the communication device with a primary application server operating in the primary communication resource.

19. The non-transitory, machine-readable storage medium of claim 18, wherein the second session-initiation-protocol registration message is received by the proxy-call-session-control-function device, wherein the proxy-call-session-control-function device transmits the second session-initiation-protocol registration message to the interrogating-call-session-control-function device, and wherein the interrogating-call-session-control-function device determines from the indicator in the second session-initiation-protocol registration message that the communication device is to be registered with the secondary communication resource.

20. The non-transitory, machine-readable storage medium of claim 19, wherein the interrogating-call-session-control-function device identifies a secondary serving-call-session-control-function device in the secondary communication resource, and wherein the secondary serving-call-session-control-function device registers the communication device with a secondary application server operating in the secondary communication resource.

\* \* \* \* \*